United States Patent Office.

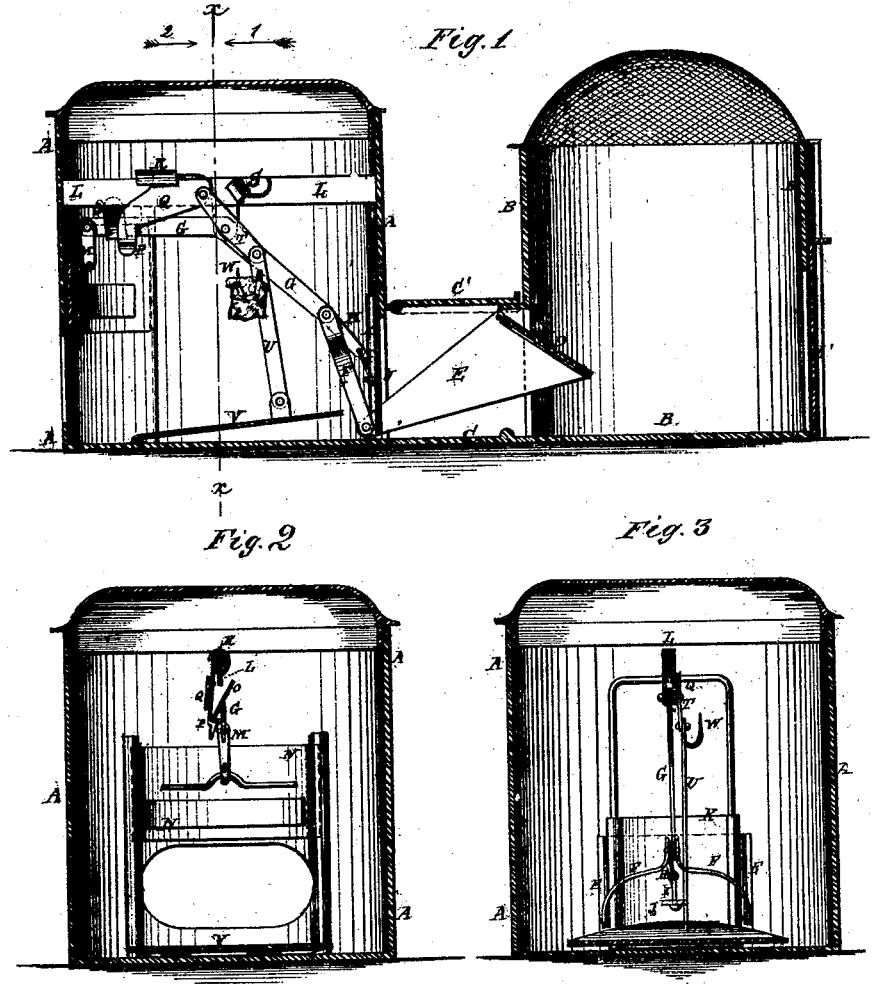

EDER E. HAUGHWOUT, OF NEW YORK, N. Y.

Letters Patent No. 101,459, dated April 5, 1870.

IMPROVED ANIMAL-TRAP.

The Schedule referred to in these Letters Patent and making part of the same.

*To all whom it may concern:*

Be it known that I, EDER E. HAUGHWOUT, of the city, county, and State of New York, have invented a new and useful Improvement in Animal-Trap; and I do hereby declare that the following is a full, clear, and exact description thereof, which will enable others skilled in the art to make and use the same, reference being had to the accompanying drawings forming part of this specification, in which—

Figure 1 is vertical longitudinal section of my improved trap.

Figure 2 is a detail vertical section of the same, taken through the line $x\,x$, fig. 1, and looking in the direction of the arrow 1.

Figure 3 is a detail vertical section of the same, taken through the line $x\,x$, fig. 1, and looking in the direction of the arrow 2.

My invention has for its object to furnish an improved animal-trap, simple in construction and effective in operation, and which shall be so constructed that the animal in trying to escape shall fasten himself in a receiving-chamber or cage, and at the same time set the trap for another animal; and It consists in the construction and combination of various parts of the trap, as hereinafter more fully described.

A and B are two boxes or chambers, cylindrical in form, and connected with each other by an inclosed passage or canal, C, the ends of which open into the chambers A B, through holes or openings in the sides of said chambers, as shown in fig. 1, the said passage and openings being made of such a size as to allow the animal trapped for to pass through freely.

The chamber B is provided with a wire-gauze or other suitable top which the animal cannot break, and which will allow the light to pass through freely.

D is a door, the middle part of which is made of glass, and which is pivoted at its upper edge to the walls of the passage C, which passage I prefer to make so long that the door D, in all its movements, may be wholly within the said passage C.

To the side edges of the door D are attached the ends of two levers, E, the other ends of which project into the chamber A, and to them are pivoted the lower branched ends of the connecting-rod F, the upper end of which is pivoted to the end of the lever G.

To the end of the lever G is also pivoted the upper end of the short connecting-rod or bar H, to the lower end of which is pivoted the upper end of a short rod, I, which passes through a lug, J, attached to the sliding door K, and has a head or nut upon its lower end to keep it from being drawn out of the said lug J.

The door K slides up and down upon ways or guides attached to the sides of the chamber A, in such positions that the door K, when down, may close the entrance into the passage C, and when raised may leave the entrance to side passage wholly unobstructed.

The lever G is made with an obtuse angle in its middle part, and is pivoted at its angle to a support attached to or formed upon the middle part of the bar L, which crosses the center of the upper part of the chamber A, and the ends of which are secured to the walls of the said chamber A.

To the other end of the lever G is pivoted the upper end of the jointed connection-rod M, the lower end of which is connected with the door N by a loop or other convenient means.

The door N slides up and down upon ways formed upon or attached to the walls of the chamber A, and when down closes the ingress-opening leading into the said chamber A.

One or more ingress-openings may be formed in the sides of the chamber A, which may be closed by one or more sliding doors N, said door or doors being connected with the end of the lever G, or with branches or arms formed upon or attached to said lever, so that they may all be operated at the same time and by the same movement.

Upon the outer arm of the lever G is formed or to it is attached a catch, O, which, when the said arm is raised, catches upon the catch P, formed upon or attached to the outer end of the arm or plate Q, which slides upon the upper edge of the cross-bar L, and is kept in place upon said bar, and its movements limited by the guide R and stop S attached to said bar L.

To the inner end of the sliding bar or plate Q is pivoted the end of the short lever T, which is pivoted to the same support to which the lever G is pivoted, and by the same bolt or pin.

To the other end of the lever T is pivoted the upper end of the connecting-rod U, the lower end of which is pivoted to the drop or platform V, at or near its forward or free edge, the rod U being made of such a length that the platform V need never come fully in contact with the bottom of the chamber A.

The other edge of the drop or platform V is pivoted to the floor or bottom of the chamber A.

W is the bait-hook, which is attached to the upper part of the rod U, out of the reach of the animal entering the chamber A.

The inclination of the platform V makes the animal think that by passing up the said platform V he will be in a more favorable position to reach the bait. In attempting to do this, his weight draws the sliding plate Q, withdrawing the catch P from the catch O. This allows the door or doors N to drop, closing the ingress opening or openings. The same movement raises the door K, uncovering the entrance into the passage C.

The chamber A is now dark, except the little light that enters through the glass part of the door D, which has been closed by the opening of the door K. The animal sees the light, and, seeking to escape, runs against and pushes open the door D, and escapes into the cage or chamber B. The operation of pushing open the door D at the same time closes the door K, and raises the door or doors N, setting the trap for another animal.

The animals may be removed from the cage or chamber B through the door b', and destroyed, or otherwise disposed of, as may be desired.

In the top of the passage C is formed a door, c', for obtaining access to said passage C, when desired.

The trap may be set by raising the door D through the door c' in the top of the passage C, or by removing the detachable top or cover of the chamber A and raising the door N, or in any other convenient manner.

Having thus described my invention,

I claim as new and desire to secure by Letters Patent—

1. The combination of the door D, made wholly or partly of glass, the levers E, the branched or forked connecting-rod F, jointed connection-rod H I, sliding door K, lever G, jointed connecting-rod M, and door or doors N, with each other and with the chambers A B and passage C, substantially as herein shown and described and for the purpose set forth.

2. The combination of the catches O P, slide Q, lever T, connecting-rod U, and hinged platform V, with each other and with the lever G, jointed connection-rods M and H I, doors K K, levers E, and door D, made partly or wholly of glass, and with the chambers A B and passage C, substantially as herein shown and described, and for the purpose set forth.

The above specification of my invention signed by me this 28th day of February, 1870.

EDER E. HAUGHWOUT.

Witnesses:
  GEO. W. MABEE,
  JAMES T. GRAHAM.